United States Patent
Bash et al.

(10) Patent No.: US 10,274,587 B2
(45) Date of Patent: Apr. 30, 2019

(54) COVERT SENSOR

(71) Applicant: RAYTHEON BBN TECHNOLOGIES CORP., Cambridge, MA (US)

(72) Inventors: Boulat A. Bash, Winchester, MA (US); Saikat Guha, Cambridge, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 0 days.

(21) Appl. No.: 15/875,904

(22) Filed: Jan. 19, 2018

(65) Prior Publication Data
US 2018/0210071 A1 Jul. 26, 2018

Related U.S. Application Data

(60) Provisional application No. 62/448,828, filed on Jan. 20, 2017.

(51) Int. Cl.
| | | |
|---|---|---|
| G01S 7/48 | (2006.01) | |
| G01S 7/481 | (2006.01) | |
| G01S 17/36 | (2006.01) | |
| G01S 7/486 | (2006.01) | |
| G01S 7/491 | (2006.01) | |

(52) U.S. Cl.
CPC .......... *G01S 7/4814* (2013.01); *G01S 7/4868* (2013.01); *G01S 7/4917* (2013.01); *G01S 17/36* (2013.01)

(58) Field of Classification Search
CPC ............................... G01S 7/4814; G01S 17/36
See application file for complete search history.

(56) References Cited

U.S. PATENT DOCUMENTS

| | | | | |
|---|---|---|---|---|
| 4,174,524 A | * | 11/1979 | Moran | G01S 17/89 348/31 |
| 2006/0011840 A1 | * | 1/2006 | Bryce | G01N 21/314 250/338.5 |
| 2007/0206963 A1 | * | 9/2007 | Koc | H04B 10/61 398/202 |
| 2011/0174078 A1 | * | 7/2011 | Chinn | G01H 9/004 73/657 |

(Continued)

FOREIGN PATENT DOCUMENTS

WO  WO 2016/172375 A1  10/2016

OTHER PUBLICATIONS

Bash, Boulat A., "Fundamental Limits of Covert Communication", Dissertation submitted to the Graduate School of the University of Massachusetts Amherst, Computer Science, Feb. 2015, 165 pages.

(Continued)

*Primary Examiner* — Hugh Maupin
(74) *Attorney, Agent, or Firm* — Lewis Roca Rothgerber Christie LLP

(57) ABSTRACT

A system for covert sensing. A broadband light source is split into two portions, a first portion of which illuminates a target, and a second portion of which is frequency shifted, e.g., by an acousto-optic frequency shifter. Light reflected from the target is combined with the frequency shifted light, detected, and demodulated with an in-phase and quadrature demodulator. The outputs of the demodulator are filtered and the arc tangent of the ratio is calculated.

20 Claims, 3 Drawing Sheets

(56) References Cited

U.S. PATENT DOCUMENTS

2014/0071456 A1* 3/2014 Podoleanu .......... G01B 9/0209
356/497

OTHER PUBLICATIONS

Bash, Boulat A. et al., "Fundamental limits of quantum-secure covert optical sensing", IEEE International Symposium on Information Theory, 2017, pp. 3210-3214.
Bash, Boulat A. et al., "Quantum-secure covert communication on bosonic channels", Oct. 19, 2015, Nature Communications, pp. 1-9.
Malik, Mehul et al., "Quantum-secured imaging", Applied Physics Letters, 2012, pp. 241103-1 through 241103-4, vol. 101.
U.S. Appl. No. 62/150,414, filed Apr. 21, 2015.
Zhang, Zheshen et al., "Entanglement's Benefit Survives an Entanglement-Breaking Channel", Physical Review Letters, American Physical Society, 2013, pp. 010501-1 through 010501-5, vol. 111.
Zhang, Zheshen et al., "Experimental Quantum Key Distribution at 1.3 Gbit/s Secret-Key Rate over a 10-dB-Loss Channel", Dec. 13, 2017, pp. 1-6.
Zhang, Zheshen et al., "Floodlight quantum key distribution: Demonstrating a framework for high-rate secure communication", Physical Review A, 2017, pp. 012332-1 through 012332-9, vol. 95.
Zhuang, Quntao et al., "Floodlight quantum key distribution: A practical route to gigabit-per-second secret-key rates", Physical Review A, Jul. 14, 2016, pp. 012322-1 through 012322-17, vol. 94.

* cited by examiner

COVERT SENSOR

CROSS-REFERENCE TO RELATED APPLICATION(S)

The present application claims priority to and the benefit of U.S. Provisional Application No. 62/448,828, filed Jan. 20, 2017, entitled "WIDEBAND ACTIVE IMAGING DEVICE", the entire content of which is incorporated herein by reference.

FIELD

One or more aspects of embodiments according to the present invention relate to covert sensing, and more particularly to a system for sensing the position of a target covertly.

BACKGROUND

In various commercial and military settings, it may be advantageous to measure the position of a target with high precision without alerting adversaries, e.g., commercial competitors or military adversaries, that the measurement is being performed. In related art sensors, methods for improving the covertness of a measurement may result in an unacceptable degradation of accuracy.

Thus, there is a need for an improved system for sensing the position of a target covertly.

SUMMARY

Aspects of embodiments of the present disclosure are directed toward a system for covert sensing. A broadband light source is split into two portions, a first portion of which illuminates a target, and a second portion of which is frequency shifted, e.g., by an acousto-optic frequency shifter. Light reflected from the target is combined with the frequency shifted light, detected, and demodulated with an in-phase and quadrature demodulator. The outputs of the demodulator are filtered and the arc tangent of the ratio is calculated.

According to an embodiment of the present invention there is provided a system for measuring fine range for a target, the system including: a light source; an optical splitter, having an input, a first output and a second output, and being configured to receive, at the input, light from the light source; an attenuator, connected to the first output of the splitter; a transmitting aperture, connected to the output of the attenuator, the transmitting aperture being configured to radiate light, received from the attenuator, in a free-space beam; a combined optical delay and frequency shifter, having: an optical input connected to the second output of the optical splitter, and an output; an optical combiner, having a first input, a second input, a first output, and a second output, the first input being connected to the output of the frequency shifter; a receiving aperture, configured to receive light reflected from the target and having an output connected to the second input of the optical combiner; a first photodetector having: an optical input configured to receive light from the first output of the optical combiner, and an output; and a control circuit connected to the first photodetector, and configured to estimate a phase of the light received by the receiving aperture relative to a phase of light radiated by the transmitting aperture.

In one embodiment, the combined optical delay and frequency shifter includes an optical delay and a frequency shifter, connected in cascade.

In one embodiment, the frequency shifter is an acousto-optic frequency shifter.

In one embodiment, the optical delay is connected to the output of the frequency shifter.

In one embodiment, the optical delay is configured to provide an adjustable delay, the delay being adjustable in increments of 1 picosecond or less.

In one embodiment, the adjustable delay includes a switched bank of delay lines.

In one embodiment, the adjustable delay further includes a glass wedge.

In one embodiment, the system includes a second photodetector having: an optical input configured to receive light from the second output of the optical combiner; and an output, wherein the control circuit is further connected to the output of the second photodetector.

In one embodiment, the control circuit includes a differential amplifier having: a first input, and a second input, and an output, the first input being connected to the first photodetector, and the second input being connected to the second photodetector.

In one embodiment, the control circuit includes: a processing circuit; a first analog to digital converter having an analog input and a digital output connected to the processing circuit; a second analog to digital converter having an analog input and a digital output connected to the processing circuit; a first frequency converter having: a first input connected to the output of the differential amplifier, a second input, and an output connected to the first analog to digital converter; and a second frequency converter having: a first input connected to the output of the differential amplifier, a second input, and an output connected to the first analog to digital converter.

In one embodiment, the first frequency converter is a mixer, and the second frequency converter is a mixer.

In one embodiment, the system includes a local oscillator connected to: an electrical input of the combined optical delay and frequency shifter; the second input of the first frequency converter; and the second input of the second frequency converter.

In one embodiment, the processing circuit is configured to estimate the phase of the light received by the receiving aperture relative to the phase of light radiated by the transmitting aperture.

In one embodiment, the processing circuit is configured to estimate the phase of the light received by the receiving aperture relative to the phase of light radiated by the transmitting aperture by: calculating a first filtered output, the first filtered output being a first sum of a plurality of consecutive samples from the first analog to digital converter; calculating a second filtered output, the second filtered output being a second sum of a plurality of consecutive samples from the second analog to digital converter; and calculating an inverse tangent of the ratio of: the second filtered output, to the first filtered output.

In one embodiment, the first sum is a weighted sum, and the second sum is a weighted sum.

In one embodiment, the light source includes a laser and an erbium doped fiber amplifier, an output of the laser being connected to an input of the erbium doped fiber amplifier.

In one embodiment, a bandwidth of the light source is greater than 1 terahertz.

In one embodiment, the combined optical delay and frequency shifter includes an optical delay, wherein the optical delay is configured to provide an adjustable delay, the delay being adjustable in increments of 1 picosecond or less.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a covert sensor provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
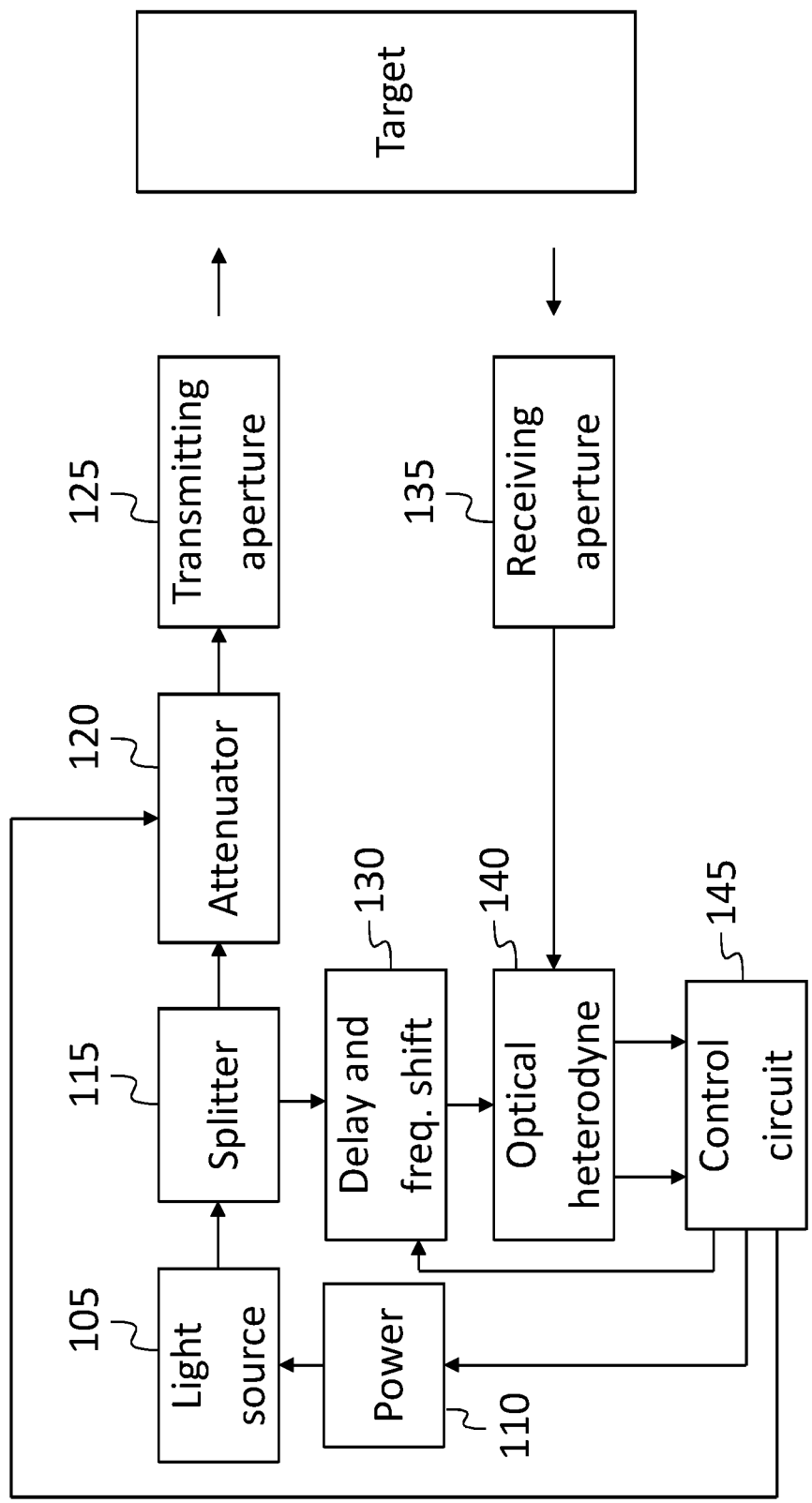
FIG. 1 is a block diagram of a covert sensor and a target according to an embodiment of the present invention.

Referring to FIG. 1, in some embodiments, a covert sensor includes a light source 105 powered by a power supply 110, illuminating a splitter 115 that delivers a fraction of the light to each of two outputs, one fed to an attenuator 120 that feeds a transmitting aperture 125, and the other fed to a combined optical delay and frequency shifter 130. Light reflected from a target is received by a receiving aperture 135, and fed to a first input of an optical heterodyne block 140, a second input of which is fed by an output of the combined optical delay and frequency shifter 130. The optical heterodyne block 140 has two electrical outputs each of which feeds a signal to a control circuit 145, which produces fine range estimates for the target and which also controls the power supply 110 and the attenuator 120, and provides a delay control and local oscillator signal to the combined optical delay and frequency shifter 130.

In operation, the light source 105 provides light both to illuminate the target (through the splitter 115, the attenuator 120, and the transmitting aperture 125), and to provide an optical local oscillator signal (through the splitter 115 and the combined optical delay and frequency shifter 130) to the optical heterodyne block 140. In the optical heterodyne block 140, the reflected light received from the target (via the receiving aperture 135), is, as described in further detail below, mixed down to an intermediate frequency electrical signal, with the intermediate frequency being determined by the magnitude of a frequency shift applied by the combined optical delay and frequency shifter 130. The intermediate frequency signal is then mixed down to baseband to form an in-phase signal and a quadrature phase signal that are fed to the control circuit 145.

As discussed in further detail below, a change in the position of the target (e.g., in the range to the target) changes the round trip delay experienced by light reflected from the target, and it therefore also changes the in-phase signal and a quadrature phase signal that are fed, by the optical heterodyne block 140, to the control circuit 145. The phase of the signal reflected from the target, relative to the phase of the optical local oscillator signal, is estimated, from the in-phase signal and the quadrature phase signal, as discussed in further detail below, by the control circuit 145. The control circuit 145 may therefore also generate, from the phase estimate, (i) an estimate of the phase of the light received by the receiving aperture relative to the phase of light radiated by the transmitting aperture (because delays internal to the sensor may be known), and, (ii) from this relative phase, a fine range (e.g., measured as a fraction of the wavelength of the light) of the target. The light source may be sufficiently broadband that the number of photons emitted, per mode, per unit time, is small; this low photon flux rate may be a significant obstacle to detection of the transmitted beam. Indeed, it may be shown that the probability of detection may be made arbitrarily small by suitable selection of the parameters of operation (including the bandwidth of the light source, and the amount of power transmitted).

The output of the light source may be a beam propagating in free space or it may be light guided in a fiber. Similarly, optical signals at any of the inputs and outputs of the elements of FIG. 1 may be beams propagating in free space or light guided in respective fibers, except that each of the signal at the output of the transmitting aperture 125 and the signal at the input of the receiving aperture 135 consists of (optical) electromagnetic waves, propagating in free space. Each of the transmitting aperture 125 and the receiving aperture 135 may be a telescope. In some embodiments the transmitting aperture 125 and the receiving aperture 135 are shared, i.e., they are a single optical device (e.g., a single telescope) with a suitable optical arrangement to separate outgoing and incoming light.

The attenuator 120 may be an electronically controlled attenuator, controlled by a (digital or analog) control signal from the control circuit 145. The attenuator 120 may control the amount of power transmitted through the transmitting aperture 125 (e.g., reducing the transmitted power to a level providing acceptable covertness). The splitter 115 may be a fiber splitter, or a free-space beam splitter (e.g., a flat optical element having an antireflection coating on one surface and a partially reflective (metal or multilayer dielectric) coating on the other surface). In some embodiments the splitter 115 is configured to transmit a sufficiently small fraction of the light toward the transmitting aperture 125 that the attenuator 120 is not needed, and the attenuator 120 may be omitted.

Figure 2B:
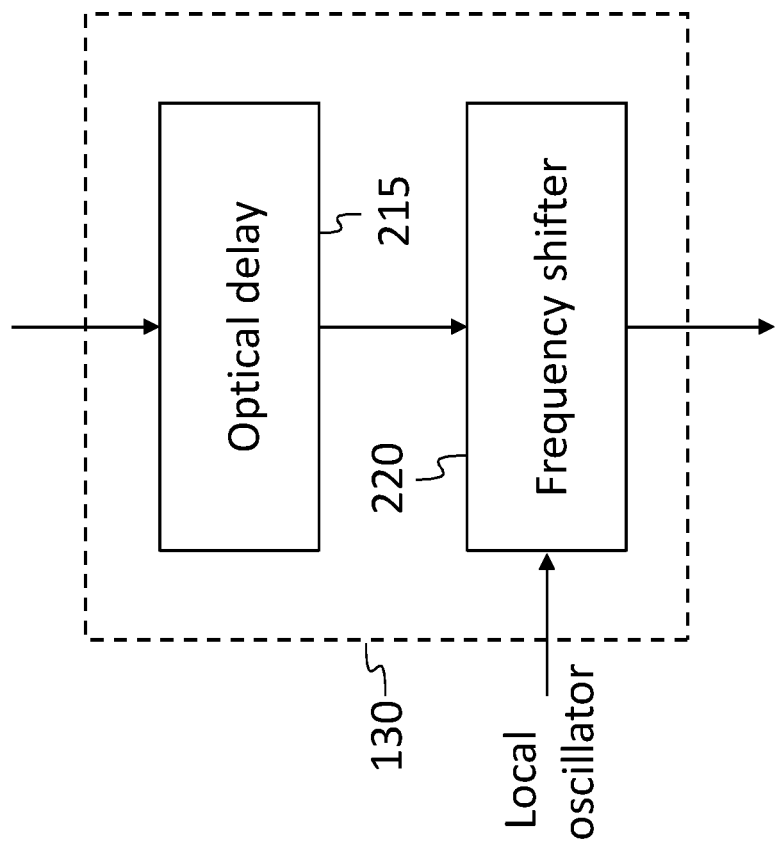
FIG. 2B is a block diagram of a portion of a covert sensor according to an embodiment of the present invention.
Figure 2A:
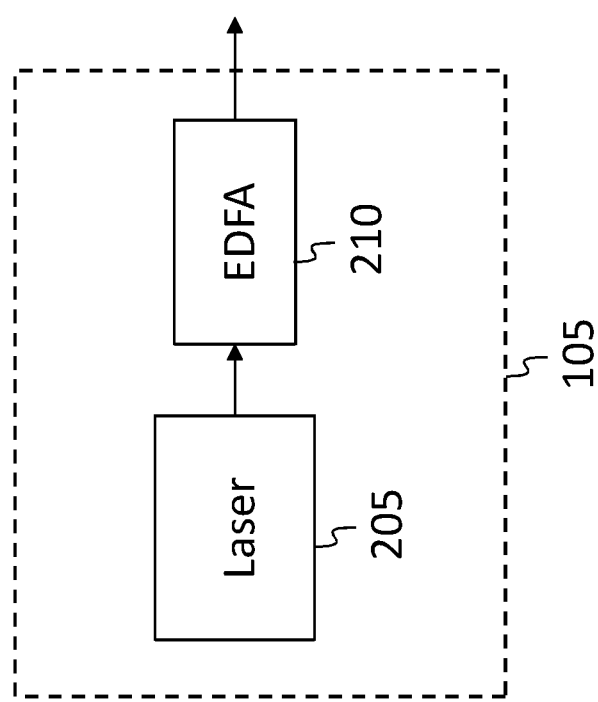
FIG. 2A is a block diagram of a portion of a covert sensor according to an embodiment of the present invention.

Referring to FIG. 2A, the light source may include a laser 205 and an erbium doped fiber amplifier (EDFA) 210. The laser may be a semiconductor laser generating light at about 1550 nm or at about 1590 nm. The output of the erbium doped fiber amplifier 210 may be relatively broadband, having a (3 dB) bandwidth of about 1 THz, or 2 THz, or more. The relatively large bandwidth of the light may improve the covertness of the sensor, as mentioned above. In other embodiments a different light source with suitable characteristics (e.g., adequate bandwidth) may be used. For example, the light source may include a thulium doped fiber amplifier, (with gain in the S-band (1450-1490 nm)), a praseodymium doped amplifier (with gain in the 1300 nm region) or an ytterbium doped fiber amplifier (with gain at wavelengths near 1 micrometer). In such a system, a laser producing light in the wavelength range within which the amplifier has gain may supply light to the input of the amplifier (e.g., an ytterbium doped fiber laser may be used with an ytterbium doped fiber amplifier). Apart from their broad gain bandwidth, ytterbium doped fiber amplifiers may offer high output power and a much better power conversion efficiency than EDFAs.

Referring to FIG. 2B, in some embodiments the combined optical delay and frequency shifter 130 includes an optical delay 215 and a frequency shifter 220. The optical delay 215 may be adjustable in increments comparable to the coherence time of the light source 105, e.g., in increments of about 0.5 picoseconds if the light source 105 has a bandwidth of about 2 THz. In FIG. 2B the frequency shifter 220 is illustrated as following the optical delay 215; in other embodiments the frequency shifter 220 may instead precede the optical delay 215.

The optical delay may include a cascade of switched banks of fixed optical delays e.g., spools of optical fiber of different lengths. For example, to construct an adjustable optical delay with a range of 10 m, and an increment of 1 cm, a cascade of ten stages of switched banks of delays (each bank including two different delays) may be used. In one such embodiment, a first stage is controllable to select between two fibers differing in length by 10 m (e.g., one fiber having a length of 1 m and another having a length of 11 m), a second stage is controllable to select between two fibers differing in length by 5 m, a third stage is controllable to select between two fibers differing in length by 2.5 m, and so on, with each stage providing a capability to switch between two lengths differing by an increment that is half that of the previous stage. In such a system the tenth stage may provide an increment of slightly less than 1 cm (i.e., $10\ m/2^{10}$).

Figure 3:
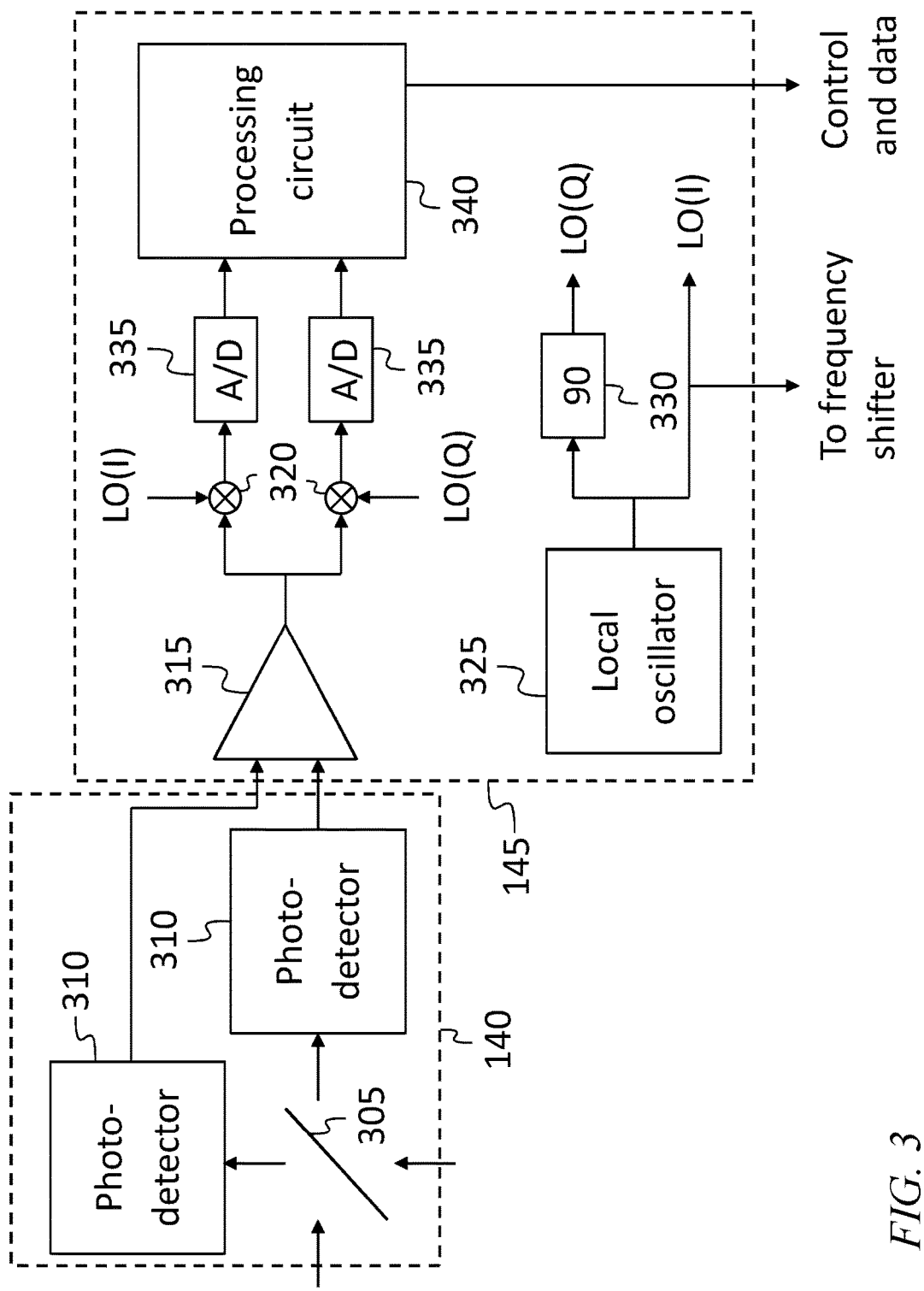
FIG. 3 is a block diagram of a portion of a covert sensor according to an embodiment of the present invention.

A fine delay adjustment may then be provided, for example, in free space, using a wedged optic on a motorized transverse translation stage, or, in fiber, using a temperature-controlled fiber, or the like. The frequency shifter 220 may be an acousto-optic frequency shifter, fed by a local oscillator signal that may be generated by a local oscillator 325 within the control circuit 145 (FIG. 3). The control circuit 145 may adjust the optical delay 215 so that the difference between (i) the total delay in the path from the light source 105 to the optical heterodyne block 140 through the combined optical delay and frequency shifter 130 and (ii) the total delay in the path from the light source 105 to the optical heterodyne block 140, through the path that includes reflection from the target, is less than or comparable to the coherence time of the light source 105. A separate coarse sensor (e.g., a Lidar or radar sensor, not shown) may be used to provide the coarse range to the target, from which the control circuit 145 may calculate the appropriate delay setting for the optical delay 215. In some embodiments the coarse sensor also uses the light source 105, e.g., using a portion of the light, diverted by an additional beam splitter.

FIG. 3 shows the optical heterodyne block 140 and the control circuit 145, in one embodiment. The optical heterodyne block 140 has two optical inputs, as mentioned above. Light from the two inputs interferes at a beam combiner 305 (e.g., an optical free space (partially reflective) beam splitter, or a fiber splitter) and light from the two outputs of the beam combiner 305 is detected by two respective photodetectors 310. The outputs of the photodetectors feed (directly, or indirectly, e.g., through respective transimpedance amplifiers that may be integrated into the photodetectors 310) a differential amplifier 315, which feeds two mixers 320, the local oscillator inputs of the two mixers being connected, respectively, to the in-phase and quadrature outputs of a circuit including a local oscillator 325 and a 90-degree phase shifter 330. The local oscillator 325 may produce a signal with a frequency (the intermediate frequency of the receiver) that is less than about 10 or 20 percent of the bandwidth of the light source 105, e.g., a signal at about 200 GHz or less. In some embodiments, a significantly lower frequency, e.g., 100 MHz, is used as the intermediate frequency, to simplify the construction of the optical heterodyne block 140 and the control circuit 145.

Each of the photodetectors 310 may be constructed to have acceptable sensitivity at the intermediate frequency, e.g., as a result of having a bandwidth greater than the intermediate frequency, or as a result of being part of a resonant circuit having a resonant frequency near the intermediate frequency (e.g., as a result of being part of a circuit including an inductor connected as a shunt across a photodiode of the photodetector, the inductor and the capacitance of the photodiode forming a resonant LC circuit). The intermediate frequency (IF) ports of the two mixers 320 (which carry the baseband signal, as a result of mixing the intermediate frequency signal from the photodetectors down to baseband) are connected to the respective analog inputs of two analog to digital converters 335, the outputs of which are connected to a processing circuit 340. The sampling rate of the analog to digital converters 335 may be at least equal to twice the bandwidth of the analog circuitry feeding their inputs (e.g., the bandwidth of the photodetectors 310, or the bandwidth of each of two anti-aliasing filters (not shown) connected in cascade with the respective inputs of the analog to digital converters 335).

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

In some embodiments, the processing circuit 340 receives a stream of in-phase samples and a stream of quadrature phase samples from the analog to digital converters 335, filters each stream, and periodically calculates an inverse tangent of the ratio of (i) the filtered quadrature phase samples to (ii) the filtered in-phase samples. The filtering may consist of forming a weighted sum of a plurality of consecutive samples, e.g., forming a running (boxcar) average of each stream, or applying another finite impulse response (FIR) filter (i.e., one with non-uniform coefficients) to each stream. In other embodiments, the filtering may consist of applying an infinite impulse response (IIR) filter to each stream.

Embodiments of the present invention may be used to perform covert measurements of fine target range. For example, with 10 cm diameter apertures, average transmitted power of $1.78 \times 10^{-15}$ W, a wavelength of 1550 nm, a bandwidth of 2 THz, channel loss for the light reflected from the target (i.e., the ratio of power received at the receiving aperture 135 to power transmitted at the transmitting aperture 125) of 25%, channel noise of 1e-7 photons per mode, and an averaging time of 10 ms, the mean squared measurement error in the fine range measurement may be less than 0.05 radians, and the detectability (by a commercial competitor or military adversary) may be less than 0.1. Here, the "detectability" means one minus the minimum error probability (the average of the probabilities of false alarm and missed detection) allowed for an arbitrary physical detection device. For longer averaging times, the mean squared measurement error in the fine range measurement may decrease as the reciprocal of the square root of the averaging time, and the detectability may be unchanged. At other wavelengths, the transmitted power for similar performance may be greater or smaller.

It will be understood that when an element or layer is referred to as being "connected to" another element, it may be directly connected to the other element, or one or more intervening elements may be present. In contrast, when an element or layer is referred to as being "directly connected to" another element, there are no intervening elements present.

Although limited embodiments of a covert sensor have been specifically described and illustrated herein, many modifications and variations will be apparent to those skilled in the art. Accordingly, it is to be understood that a covert sensor employed according to principles of this invention may be embodied other than as specifically described herein. The invention is also defined in the following claims, and equivalents thereof.

What is claimed is:

1. A system for measuring fine range for a target, the system comprising:
   a light source;
   an optical splitter, having an input, a first output and a second output, and being configured to receive, at the input, light from the light source;
   a transmitting aperture, connected to the first output of the splitter, the transmitting aperture being configured to radiate light, received from the first output of the splitter, in a free-space beam;
   a combined optical delay and frequency shifter, having:
      an optical input connected to the second output of the splitter, and
      an output;
   an optical combiner, having a first input, a second input, a first output, and a second output, the first input being connected to the output of the frequency shifter;
   a receiving aperture, configured to receive light reflected from the target and having an output connected to the second input of the optical combiner;
   a first photodetector having:
      an optical input configured to receive light from the first output of the optical combiner, and
      an output; and
   a control circuit connected to the first photodetector, and configured to estimate a phase of the light received by the receiving aperture relative to a phase of light radiated by the transmitting aperture,
   wherein the combined optical delay and frequency shifter includes an optical delay and a frequency shifter, connected in cascade, the frequency shifter being configured to produce a steady-state frequency shift.

2. The system of claim 1, wherein the frequency shifter is an acousto-optic frequency shifter.

3. The system of claim 1, wherein the optical delay is connected to the output of the frequency shifter.

4. The system of claim 1, wherein the optical delay is configured to provide an adjustable delay, the delay being adjustable in increments of 1 picosecond or less.

5. The system of claim 1, wherein the adjustable delay comprises a switched bank of delay lines.

6. The system of claim 5, wherein the adjustable delay further comprises a glass wedge.

7. The system of claim 1, wherein the transmitting aperture is connected to the first output of the splitter through an attenuator.

8. The system of claim 1, further comprising a second photodetector having:
   an optical input configured to receive light from the second output of the optical combiner; and
   an output,
   wherein the control circuit is further connected to the output of the second photodetector.

9. The system of claim 8, wherein the control circuit comprises a differential amplifier having:
   a first input, and
   a second input, and an output,
   the first input being connected to the first photodetector, and
   the second input being connected to the second photodetector.

10. The system of claim 1, wherein the light source comprises a laser and a fiber amplifier, an output of the laser being connected to an input of the fiber amplifier.

11. A system for measuring fine range for a target, the system comprising:
    a light source;
    an optical splitter, having an input, a first output and a second output, and being configured to receive, at the input, light from the light source;
    a transmitting aperture, connected to the first output of the splitter, the transmitting aperture being configured to radiate light, received from the first output of the splitter, in a free-space beam;
    a combined optical delay and frequency shifter, having:
       an optical input connected to the second output of the splitter, and
       an output;
    an optical combiner, having a first input, a second input, a first output, and a second output, the first input being connected to the output of the frequency shifter;
    a receiving aperture, configured to receive light reflected from the target and having an output connected to the second input of the optical combiner;
    a first photodetector having:
       an optical input configured to receive light from the first output of the optical combiner, and
       an output;
    a control circuit connected to the first photodetector, and configured to estimate a phase of the light received by the receiving aperture relative to a phase of light radiated by the transmitting aperture;
    a second photodetector having:
       an optical input configured to receive light from the second output of the optical combiner; and
       an output,
    wherein the control circuit is further connected to the output of the second photodetector,
    wherein the control circuit comprises a differential amplifier having:
       a first input, and
       a second input, and an output,
    the first input of the differential amplifier being connected to the first photodetector, and
    the second input of the differential amplifier being connected to the second photodetector,
    wherein the control circuit comprises:
       a processing circuit;

a first analog to digital converter having an analog input and a digital output connected to the processing circuit;
a second analog to digital converter having an analog input and a digital output connected to the processing circuit;
a first frequency converter having:
a first input connected to the output of the differential amplifier,
a second input, and
an output connected to the first analog to digital converter; and
a second frequency converter having:
a first input connected to the output of the differential amplifier,
a second input, and
an output connected to the first analog to digital converter.

12. The system of claim 11, wherein:
the first frequency converter is a mixer, and
the second frequency converter is a mixer.

13. The system of claim 11, further comprising a local oscillator connected to:
an electrical input of the combined optical delay and frequency shifter;
the second input of the first frequency converter; and
the second input of the second frequency converter.

14. The system of claim 11, wherein the processing circuit is configured to estimate the phase of the light received by the receiving aperture relative to the phase of light radiated by the transmitting aperture.

15. The system of claim 14, wherein the processing circuit is configured to estimate the phase of the light received by the receiving aperture relative to the phase of light radiated by the transmitting aperture by:
calculating a first filtered output, the first filtered output being a first sum of a plurality of consecutive samples from the first analog to digital converter;
calculating a second filtered output, the second filtered output being a second sum of a plurality of consecutive samples from the second analog to digital converter; and
calculating an inverse tangent of the ratio of:
the second filtered output, to
the first filtered output.

16. The system of claim 15, wherein the first sum is a weighted sum, and the second sum is a weighted sum.

17. The system of claim 10, wherein the fiber amplifier is an erbium doped fiber amplifier.

18. The system of claim 10, wherein a bandwidth of the light source is greater than 1 terahertz.

19. The system of claim 18, wherein the combined optical delay and frequency shifter comprises an optical delay, wherein the optical delay is configured to provide an adjustable delay, the delay being adjustable in increments of 1 picosecond or less.

20. A system for measuring fine range for a target, the system comprising:
a light source;
an optical splitter, having an input, a first output and a second output, and being configured to receive, at the input, light from the light source;
a transmitting aperture, connected to the first output of the splitter, the transmitting aperture being configured to radiate light, received from the first output of the splitter, in a free-space beam;
a combined optical delay and frequency shifter, having:
an optical input connected to the second output of the optical splitter, and
an output;
an optical combiner, having a first input, a second input, a first output, and a second output, the first input being connected to the output of the frequency shifter;
a receiving aperture, configured to receive light reflected from the target and having an output connected to the second input of the optical combiner;
a first photodetector having:
an optical input configured to receive light from the first output of the optical combiner, and
an output;
a control circuit connected to the first photodetector, and configured to estimate a phase of the light received by the receiving aperture relative to a phase of light radiated by the transmitting aperture;
a second photodetector having:
an optical input configured to receive light from the second output of the optical combiner; and
an output,
wherein the control circuit is further connected to the output of the second photodetector,
wherein the control circuit comprises a differential amplifier having:
a first input, and
a second input, and an output,
the first input of the differential amplifier being connected to the first photodetector, and
the second input of the differential amplifier being connected to the second photodetector,
wherein the control circuit comprises:
a processing circuit;
a first frequency converter having:
a first input connected to the output of the differential amplifier,
a second input, and
an output; and
a second frequency converter having:
a first input connected to the output of the differential amplifier,
a second input, and
an output.

* * * * *